United States Patent
Niimi et al.

(10) Patent No.: US 7,348,873 B2
(45) Date of Patent: Mar. 25, 2008

(54) MULTILAYER POSITIVE TEMPERATURE COEFFICIENT THERMISTOR AND METHOD FOR DESIGNING THE SAME

(75) Inventors: Hideaki Niimi, Hikone (JP); Akira Ando, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/595,558

(22) PCT Filed: Sep. 13, 2004

(86) PCT No.: PCT/JP2004/013316

§ 371 (c)(1),
(2), (4) Date: Apr. 27, 2006

(87) PCT Pub. No.: WO2005/043555

PCT Pub. Date: May 12, 2005

(65) Prior Publication Data

US 2007/0115090 A1    May 24, 2007

(30) Foreign Application Priority Data

Oct. 30, 2003  (JP) .............................. 2003-370267

(51) Int. Cl.
*H01C 7/10*  (2006.01)
(52) U.S. Cl. .................... 338/22 R; 338/307; 257/528; 361/311
(58) Field of Classification Search .............. 338/22 R, 338/260, 306–309, 327–328; 257/700–701, 257/528, 532, 692–693; 361/311–313
See application file for complete search history.

(56) References Cited

U.S. PATENT DOCUMENTS

| 4,486,737 A | * | 12/1984 | Ott | ............................ 338/22 R |
| 4,766,409 A | * | 8/1988 | Mandai | ..................... 338/22 R |
| 5,493,266 A | * | 2/1996 | Sasaki et al. | .............. 338/22 R |
| 6,094,129 A | * | 7/2000 | Baiatu | ....................... 338/22 R |
| 6,359,327 B1 | | 3/2002 | Niimi et al. | |
| 6,525,395 B1 | * | 2/2003 | Kawase et al. | .............. 257/528 |

FOREIGN PATENT DOCUMENTS

| JP | 06-302403 A | 10/1994 |
| JP | 2000-256062 A | 9/2000 |
| JP | 2001-167906 A | 6/2001 |
| JP | 2002-043103 A | 2/2002 |
| JP | 2004-63548 A | 2/2004 |

OTHER PUBLICATIONS

International Search Report issued in the corresponding International Application No. PCT/JP2004/013316, mailed on Dec. 21, 2004.

* cited by examiner

*Primary Examiner*—K. Richard Lee
(74) *Attorney, Agent, or Firm*—Keating & Bennett, LLP

(57) ABSTRACT

A multilayer PTC thermistor reliably decreases the resistance by decreasing the thickness of ceramic layers composed of a $BaTiO_3$ semiconductor ceramic and achieves a resistance close to the resistance calculated from the multilayer structure. The thermistor is adjusted to satisfy the conditions $5 \leq X \leq 18$ and $4 \leq X \cdot Y \leq 10$, wherein X is a thickness (μm) of each ceramic layer disposed between adjacent internal electrodes and Y is a donor content (%) in the barium titanate semiconductor ceramic constituting the ceramic layers, Y being expressed in terms of (number of donor atoms/number of Ti atoms)×100.

2 Claims, 1 Drawing Sheet

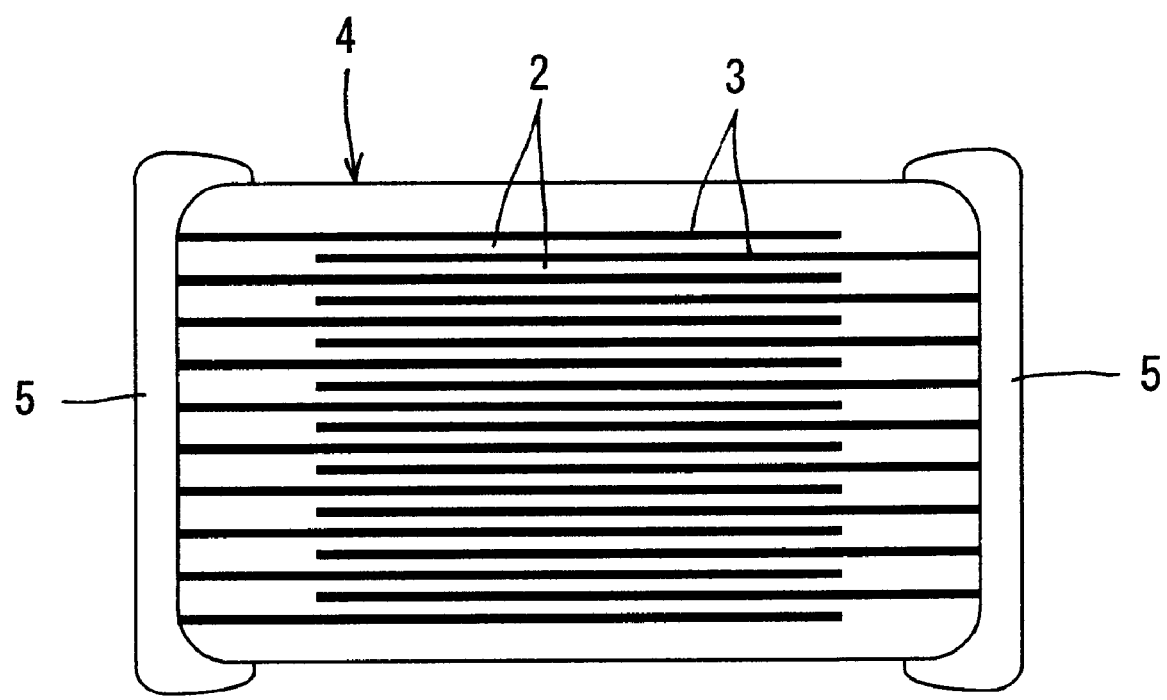

MULTILAYER POSITIVE TEMPERATURE COEFFICIENT THERMISTOR AND METHOD FOR DESIGNING THE SAME

BACKGROUND OF THE INVENTION

1. Field of the Invention

The present invention relates to positive temperature coefficient (PTC) thermistors and methods for designing the PTC thermistors. In particular, the present invention relates to a PTC thermistor including a barium titanate semiconductor ceramic and a method for designing such a thermistor.

2. Description of the Related Art

Barium titanate ($BaTiO_3$) semiconductor ceramics are widely used to fabricate PTC thermistors. In order to further expand the applications of the PTC thermistors, ardent attempts are being made to further decrease the resistance of the thermistors. One such attempt other than development of $BaTiO_3$ semiconductor ceramics having lower resistivity is the use of a multilayer PTC thermistor as disclosed in Japanese Unexamined Patent Application Publication No. 2002-43103.

The FIGURE is a cross-sectional view of a PTC thermistor related to the present invention. The FIGURE shows a multilayer PTC thermistor 1.

Referring to the FIGURE, the multilayer PTC thermistor 1 includes an element main body 4 including stacked ceramic layers 2 made of a $BaTiO_3$ semiconductor ceramic exhibiting a positive temperature characteristic of resistance and internal electrodes 3 each disposed at the interface between adjacent ceramic layers 2.

External electrodes 5 are provided at the ends of the element main body 4. The internal electrodes 3 electrically connected to the external electrodes 5 at one end and the internal electrodes 3 electrically connected to the external electrode 5 at the other end are alternately arranged.

In the multilayer PTC thermistor 1 described above, the internal electrodes 3 contain nickel in most cases. This is because nickel is relatively inexpensive and can provide an Ohmic characteristic to the ceramic layers 2.

The external electrodes 5 contain, for example, silver as a conductive component.

The multilayer PTC thermistor 1 is made by the following process.

First, ceramic green sheets, which contain a ceramic material powder for forming a $BaTiO_3$ semiconductor ceramic and which is the material of the ceramic layers 2, are prepared.

A conductive paste containing nickel, which is the material of the internal electrodes 3, is applied by printing or the like on the ceramic green sheets.

The ceramic green sheets with the conductive paste layers are then stacked, and additional ceramic green sheets not having conductive paste layers are disposed at the top and the bottom of the stack for protection. The ceramic green sheets are then press-bonded and, if necessary, cut to predetermined dimensions to prepare a green compact of the element main body 4.

The green compact of the element main body 4 is baked in a reducing atmosphere so that nickel contained in the conductive paste for making the internal electrodes 3 does not undergo oxidation. As a result, the ceramic green sheets and the layers of the conductive pastes sinter to form the ceramic layers 2 and the internal electrodes 3.

A conductive paste containing silver is applied on both ends of the sintered element main body 4 and baked in air to form the external electrodes 5.

This baking step also serves as a re-oxidation step for the sintered element main body 4. This step imparts a thermistor characteristic to the ceramic layers 2.

Thus, the multilayer PTC thermistor 1 is made.

The above-described multilayer PTC thermistor 1 has a lower resistance because the thickness of each ceramic layer 2 is decreased by the use of the multilayer structure for the element main body 4.

However, thickness reduction of the ceramic layers 2 does not necessarily result in a decreased resistivity intended to be achieved in actual cases.

This problem is described in detail with reference to the FIGURE. Suppose that the element main body 4 is 2.0 mm×1.2 mm in a plan view and a room temperature resistance of 2Ω is observed for a laminate including 10 ceramic layers 2 each being about 100 µm in thickness. Theoretically, a room temperature resistance of 0.02Ω should be observed by decreasing the thickness of each ceramic layer 2 to one tenth, i.e., 10 µm, and increasing the number of the ceramic layer 2 to ten-fold, i.e., 100. However, in actual observations, the room temperature resistance is sometimes only about 0.28Ω.

The tendency of the actual resistance to deviate from the calculated value is more notable as the thickness of the ceramic layers 2 is decreased to 18 µm or less. In extreme cases, no decrease in resistance is achieved despite the thickness reduction.

SUMMARY OF THE INVENTION

In order to overcome the problems described above, preferred embodiments of the present invention provide a multilayer PTC thermistor that can reliably decrease the resistance by decreasing the thickness of ceramic layers and achieve a resistance close to the resistance calculated from the multilayer structure, and a method for designing a PTC thermistor that achieves the advantages described above.

The present inventors discovered that, during the step of baking a green element main body performed to make a multilayer PTC thermistor, nickel contained in the internal electrodes diffuses into adjacent ceramic layers, that the diffused nickel acts as an acceptor, and that the influence of the diffused nickel near the internal electrodes increases as the thickness of the ceramic layer is decreased. As a result, the resistance of the ceramic layers is increased, thereby preventing a decrease in the resistance of the PTC thermistor. Various preferred embodiments of the present invention have been developed based on these discoveries.

To put it briefly, the present invention pays particular attention to a donor contained in the barium titanate semiconductor ceramic constituting the ceramic layers, the donor being capable of canceling out the action of nickel as an acceptor. The factor that prevents the resistance reduction is eliminated by regulating the amount of the donor within a particular range.

According to a specific preferred embodiment of the present invention, a multilayer positive temperature coefficient thermistor includes a multilayer element main body having a plurality of stacked ceramic layers including a barium titanate semiconductor ceramic exhibiting a positive temperature characteristic of resistance, and a plurality of internal electrodes including nickel, the internal electrodes being disposed at the interfaces of the ceramic layers. In order to overcome the above-described technical problems, the thermistor has the following features.

That is, the thermistor satisfies the following preferred conditions: $5 \leq X \leq 18$ and $4 \leq X \cdot Y \leq 10$, wherein X is a thickness expressed in μm of each ceramic layer between the internal electrodes and Y is a donor content expressed in percentage in the barium titanate semiconductor ceramic expressed in terms of (number of donor atoms/number of Ti atoms)×100.

Another preferred embodiment of the present invention provides a method for designing a multilayer positive temperature coefficient thermistor including a multilayer element main body including a plurality of stacked ceramic layers including a barium titanate semiconductor ceramic exhibiting a positive temperature characteristic of resistance and a plurality of internal electrodes including nickel, the internal electrodes being disposed at the interfaces of the ceramic layers.

The method includes the steps of determining a thickness X expressed in μm of each ceramic layer so as to satisfy the condition $5 \leq X \leq 18$ and determining the donor content Y expressed in percentage in the barium titanate semiconductor ceramic according to the thickness X so as to satisfy the condition $4 \leq X \cdot Y \leq 10$, wherein the donor content Y is expressed in terms of (number of donor atoms/number of Ti atoms)×100.

The inventive multilayer positive temperature coefficient thermistor or the multilayer positive temperature coefficient thermistor produced by the inventive method can reliably achieve decreased resistance by reducing the thickness of the ceramic layers and can exhibit a resistance close to the resistance calculated from the multilayer structure.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

The FIGURE is a cross-sectional view of a multilayer positive temperature coefficient thermistor 1 related to the present invention.

DETAILED DESCRIPTION OF PREFERRED INVENTIONS

The present invention will now be described with respect to preferred embodiments with reference to the FIGURE mentioned above. The FIGURE also shows a multilayer PTC thermistor 1 according to a preferred embodiment of the present invention. Basically, the descriptions of the structure of the multilayer PTC thermistor 1 and of the fabrication method therefor presented in the previous sections with reference to the FIGURE equally apply to the multilayer PTC thermistor 1 of the preferred embodiments of the present invention. The explanation therefor is thus simplified to avoid redundancy.

Referring to the FIGURE, the present invention is applicable when each of the ceramic layers 2 has a thickness X (μm) satisfying the condition $5 \leq X \leq 18$. In other words, the present invention is applicable when the thickness X of each ceramic layer 2 is in the range of about 5 μm to about 18 μm.

In the PTC thermistor 1, the donor content Y (%) in the $BaTiO_3$ semiconductor ceramic constituting the ceramic layer 2 is adjusted to satisfy $4 \leq X \cdot Y \leq 10$, where the donor content Y is (number of donor atoms/number of Ti atoms)×100. In other words, the donor content Y is increased as the thickness X of the ceramic layer 2 is decreased.

The condition $4 \leq X \cdot Y \leq 10$ is determined based on the results of the experiments described below. The experiments show that action as the acceptor of the nickel diffused into the ceramic layers can be effectively cancelled out by increasing the donor content Y so as to satisfy the condition $4 \leq X \cdot Y \leq 10$. Thus, the resistance can be reduced even when the thickness X of the ceramic layer 2 is reduced to about 18 μm or less.

When the content Y is excessively large thereby not satisfying the condition $4 \leq X \cdot Y \leq 10$, the thermistor characteristic, i.e., the characteristic that the resistance exhibits a positive temperature coefficient, of the ceramic layer 2 is decreased. When the content Y is excessively small thereby not satisfying the condition $4 \leq X \cdot Y \leq 10$, action as the acceptor of nickel is rarely cancelled and thus, it becomes difficult to reduce the resistance.

Examples of the donor contained in the $BaTiO_3$ semiconductor ceramic include rare earth elements such as La and Sm and quinquevalent elements such as Nb and Sb.

Next, the experiments conducted to determine the above-described condition are described.

Note that in the experiments, a multilayer PTC thermistor having external electrodes constituted from Ni-containing inner layers and Ag-containing outer layers was prepared.

Powders of $BaCO_3$, $TiO_2$, and $Sm_2O_3$ were used as the starting materials. Each sample was prepared by compounding the starting materials by varying Z in $(Ba_{1-z}Sm_z)TiO_3$ to obtain a $BaTiO_3$ semiconductor ceramic having a donor content Y (%) shown in Table 1.

Deionized water was added to each sample of starting material powders compounded as described above. The resulting mixture was mixed and milled for 5 hours using zirconia balls, dried, and calcined at about 1,150° C. for about 2 hours.

The resulting calcined powder was combined with an organic binder, a dispersant, and water, and the resulting mixture was mixed for several hours using zirconia balls to obtain a slurry. The slurry was formed into sheets to prepare ceramic green sheets. In this step, ceramic green sheets of various thicknesses were prepared so that the thicknesses X after the sintering have the values as shown in Table 1.

A Ni-containing conductive paste was applied onto each ceramic green sheet by printing to form a conductive paste layer to become an internal electrode later.

The ceramic green sheets were stacked so that the conductive paste layers opposed each other with a ceramic green sheet therebetween. Ceramic green sheets not provided with the conductive paste layers were then stacked on the top and the bottom of the stack for protection. The ceramic green sheets were press-bonded and cut into a green element main body that would have dimensions of approximately 2.0 mm×1.25 mm, for example, after sintering.

In the above-described step of preparing the green element main body, the number of stacked ceramic green sheets was adjusted according to the thickness of the ceramic green sheet used in each sample so that the thickness after sintering would become about 1.2 mm for all samples shown in Table 1.

Next, a Ni-containing conductive paste was then applied on the two ends of the green element main body and dried.

The green element main body was baked at about 1,170° C. in a reducing atmosphere of $H_2/N_2$=3% to sinter the ceramic green sheets and the conductive paste layers, thereby obtaining sintered element main body constituted by ceramic layers and internal electrodes. The conductive paste applied on the two ends of the green element main body also sintered, thereby obtaining a sintered inner layer of each external electrode.

An Ag-containing conductive paste was applied on the inner layer of the external electrode at each end of the sintered element main body, dried, and baked at about 700° C. in air to obtain outer layers of the external electrodes. At the same time, the ceramic layers were reoxidized to impart a thermistor characteristic to the ceramic layers.

A multilayer PTC thermistor of each sample prepared as described above was analyzed to determine the room temperature resistance and the thermistor characteristic by a four probe method as shown in Table 1.

Table 1 also shows a calculated room temperature resistance and the ratio of the observed room temperature resistance to the calculated room temperature resistance of each sample. The calculated resistance was determined from the resistivity of a sufficiently thick (e.g., about 100 μm) layer composed of the $BaTiO_3$ semiconductor ceramic of each sample shown in Table 1 and the thickness of each sample.

The thermistor characteristic shown in Table 1 is a number calculated by the ratio $R_{250}/R_{25}$ determined from the logarithm $\log(R_{250}/R_{25})$ of the ratio of the resistance $R_{250}$ observed at 250° C. to the resistance $R_{25}$ observed at 25° C.

sample 8, about 15 μm for sample 9, about 10 μm for sample 10, about 7 μm for sample 11, about 5 μm for sample 12, and about 4 μm for sample 13. That is, the thickness is reduced in the ascending order. In such cases, when the thickness X is reduced to about 18 μm or less as in samples 8 to 13, the observed room temperature resistance tends to deviate from the calculated value more and more and the ratio to the calculated resistance tends to increase as the thickness X decreases. However, because the condition $4 \leq X \cdot Y \leq 10$ is met, the resistance can be properly reduced by reducing the thickness while keeping the ratio of the observed resistance to the calculated value to a relatively low level.

Samples 1 to 6 had the same thickness X but different donor contents Y. The value of X·Y was about 2.3 for sample 1, about 3 for sample 2, about 4 for sample 3, about 6 for sample 4, about 10 for sample 5, and about 12 for sample 6. That is, the value of X·Y was increased in the ascending order. In such cases, the resistance can be decreased while keeping the ratio of the observed resistance to the calculated value to less than about 3.0 by satisfying the condition $4 \leq X \cdot Y \leq 10$, as in samples 3 to 5.

Note that when the thickness X exceeds approximately 18 μm, sufficient resistance reduction is not possible because the room temperature resistance becomes about 0.6Ω

TABLE 1

| Sample No. | Y (%) | Thickness X (μm) | X · Y | Room temperature resistance (Ω) | Calculated resistance (Ω) | Ratio of observed resistance to calculated resistance | Thermistor characteristic $\log(R_{250}/R_{25})$ |
|---|---|---|---|---|---|---|---|
| *1 | 0.15 | 15 | 2.3 | 0.8 | 0.197 | 4.1 | 3.5 |
| *2 | 0.2 | 15 | 3 | 0.5 | 0.141 | 3.6 | 3.6 |
| 3 | 0.27 | 15 | 4 | 0.3 | 0.113 | 2.7 | 3.5 |
| 4 | 0.4 | 15 | 6 | 0.23 | 0.118 | 1.9 | 3.4 |
| 5 | 0.67 | 15 | 10 | 0.23 | 0.124 | 1.9 | 3.3 |
| *6 | 0.8 | 15 | 12 | 0.35 | 0.129 | 2.7 | 2.7 |
| *7 | 0.24 | 25 | 6 | 0.6 | 0.359 | 1.7 | 3.5 |
| 8 | 0.33 | 18 | 6 | 0.29 | 0.162 | 1.8 | 3.5 |
| 9 | 0.4 | 15 | 6 | 0.23 | 0.118 | 1.9 | 3.4 |
| 10 | 0.6 | 10 | 6 | 0.12 | 0.055 | 2.2 | 3.4 |
| 11 | 0.86 | 7 | 6 | 0.07 | 0.028 | 2.5 | 3.3 |
| 12 | 1.2 | 5 | 6 | 0.04 | 0.015 | 2.7 | 3.2 |
| *13 | 1.5 | 4 | 6 | 0.03 | 0.010 | 3.0 | 2.8 |

In Table 1, the samples outside the range of preferred embodiments of the present invention are indicated by asterisks.

Samples that exhibited a room temperature resistance of about 0.3Ω or less, a ratio of the calculated resistance of less than about 3.0, and a number of digits of the thermistor characteristic of about 3.0 or greater are in the range of preferred embodiments of the present invention.

The results indicated in Table 1 show that although all samples exhibited a room temperature resistance larger than the calculated value, the samples within the range of preferred embodiments of the present invention exhibited a resistance close to the calculated value, thereby achieving lower resistance by thickness reduction.

In order to simplify the comparison of the samples shown in Table 1, samples 1 to 6 of a first group were designed to have the same thickness X, i.e., about 15 μm, and samples 7 to 13 of a second group were designed to have the same value of X·Y, i.e., about 6. Sample 4 in the first group is the same value as sample 9 in the second group.

Samples 7 to 13 all had the same value of X·Y. The thickness X was about 25 μm for sample 7, about 18 μm for exceeding about 0.3Ω, as in sample 7 although the ratio of the observed resistance to the calculated value can be decreased. Moreover, when the thickness X is less than about 5 μm, a satisfactory thermistor characteristic cannot be obtained even when the value of X·Y is adjusted within a range of $4 \leq X \cdot Y \leq 10$, as in sample 13.

The results of the experiments show that when the thickness X (μm) of each ceramic layer is $5 \leq X \leq 18$, the resistance can be reliably reduced by reducing the thickness of the ceramic layer by controlling the donor content Y (%) in the $BaTiO_3$ semiconductor ceramic constituting the ceramic layer in the range of $4 \leq X \cdot Y \leq 10$. Furthermore, a resistance close to the value calculated from the multilayer structure can be achieved.

The above-described conditions can also be used in designing a multilayer PTC thermistor according to preferred embodiments of the present invention.

That is, in the designing method, the thickness X (μm) of the ceramic layer is determined to satisfy the condition $5 \leq X \leq 18$ and the donor content Y (%) in the $BaTiO_3$ semiconductor ceramic is determined to satisfy the condition $4 \leq X \cdot Y \leq 10$.

The present invention is advantageously applied to a multilayer positive temperature coefficient thermistor having ceramic layers composed of a $BaTiO_3$ semiconductor ceramic, in which the thickness of the ceramic layers is reduced to achieve lower resistance.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

The invention claimed is:

1. A multilayer positive temperature coefficient thermistor comprising:
   a multilayer element main body including a plurality of stacked ceramic layers including a barium titanate semiconductor ceramic exhibiting a positive temperature characteristic of resistance and a plurality of internal electrodes including nickel, the internal electrodes being disposed at the interfaces of the ceramic layers;
   wherein the following conditions are satisfied:

$5 \leq X \leq 18$; and $4 \leq X \cdot Y \leq 10$;

wherein X is a thickness expressed in μm of each ceramic layer between the internal electrodes and Y is a donor content expressed in percentage in the barium titanate semiconductor ceramic expressed in terms of (number of donor atoms/number of Ti atoms)×100.

2. A method for designing a multilayer positive temperature coefficient thermistor comprising a multilayer element main body including a plurality of stacked ceramic layers including a barium titanate semiconductor ceramic exhibiting a positive temperature characteristic of resistance and a plurality of internal electrodes including nickel, the internal electrodes being disposed at the interfaces of the ceramic layers, the method comprising the steps of:
   determining a thickness X expressed in μm of each ceramic layer so as to satisfy the condition $5 \leq X \leq 18$; and
   determining the donor content Y expressed in percentage in the barium titanate semiconductor ceramic according to the thickness X so as to satisfy the condition $4 \leq X \cdot Y \leq 10$, wherein the donor content Y is expressed in terms of (number of donor atoms/number of Ti atoms)×100.

* * * * *